United States Patent [19]

Fisher et al.

[11] 4,370,350

[45] Jan. 25, 1983

[54] CHEWING GUM METHOD

[75] Inventors: E. Eugene Fisher, Chicago; R. Ray Estes, Downers Grove, both of Ill.; Orvin D. Lokken; Elmer G. Paquette, both of Madison, Wis.

[73] Assignee: Wm. Wrigley Jr. Company, Chicago, Ill.

[21] Appl. No.: 144,685

[22] Filed: Apr. 28, 1980

[51] Int. Cl.³ .............................................. A23G 3/30
[52] U.S. Cl. .......................................... 426/5; 426/74; 426/658
[58] Field of Search ....................... 426/5, 3, 548, 658, 426/7, 74

[56] References Cited

U.S. PATENT DOCUMENTS

| | | | |
|---|---|---|---|
| 3,020,164 | 2/1962 | Forkner | 426/5 |
| 3,262,784 | 7/1966 | Bucher | 426/5 |
| 3,632,358 | 1/1972 | Echeandia | 426/3 |
| 4,000,321 | 12/1976 | Mochizuki | 426/3 |
| 4,150,161 | 4/1979 | Rudolph | 426/3 |
| 4,161,544 | 7/1979 | Kaul | 426/5 |
| 4,217,368 | 8/1980 | Witzel et al. | 426/3 |
| 4,238,475 | 12/1980 | Witzel | 426/3 |

FOREIGN PATENT DOCUMENTS 53-2808160  2/1978  Japan ........................ 426/5

Primary Examiner—Jeanette M. Hunter
Attorney, Agent, or Firm—McCaleb, Lucas & Brugman

[57] ABSTRACT

In the manufacture of chewing grum, the viscosity of a chewing gum base is first reduced by heating. Thereafter, a major portion of a bulking agent, such as a carbohydrate, is added to the gum base while homogeneously mixing the ingredients. The mixture is cooled in order to increase its viscosity and to form granules thereof. The balance of the bulking agent is then added, preferably in increments, to form layers around the granules. The overall effect of the resultant chewing gum product is an improved initial taste impact due to the superficially positioned, typically sweet, bulking agent and a subsequent, long-lasting taste development due to the internal mixture of the bulking agent with the base.

10 Claims, 8 Drawing Figures

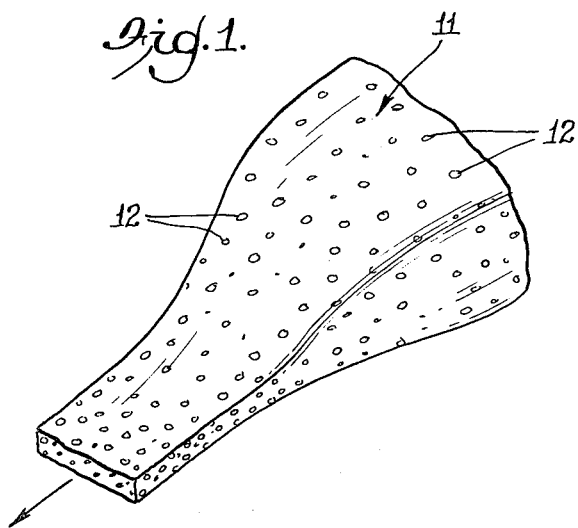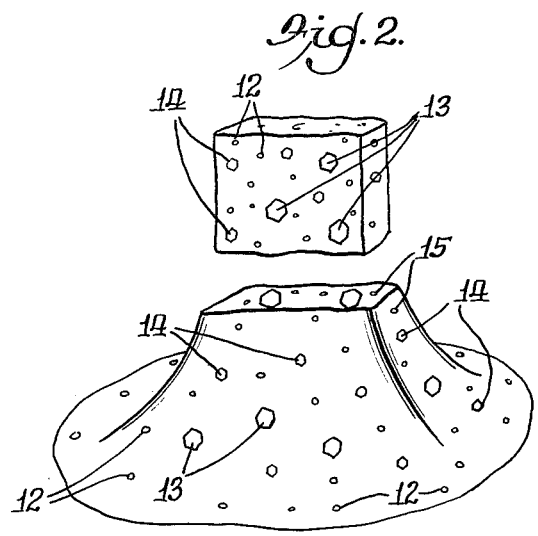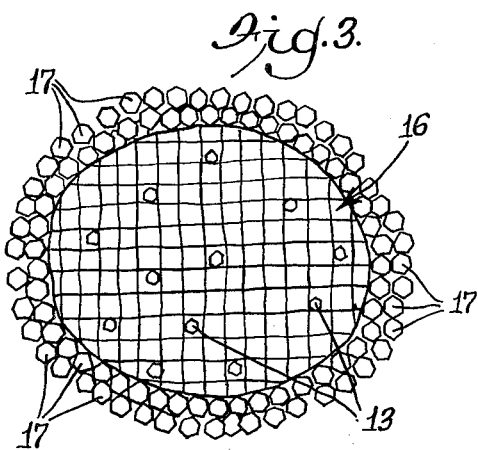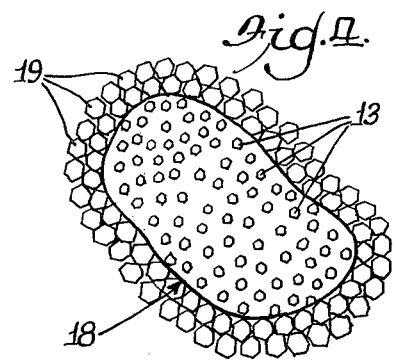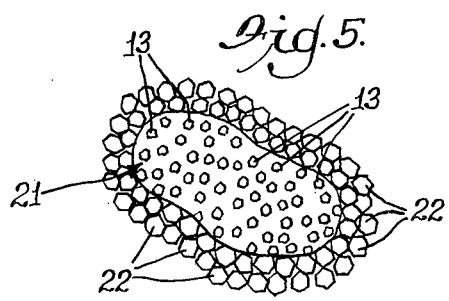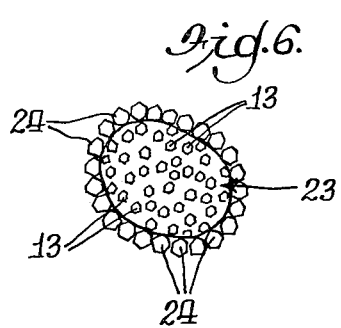

CHEWING GUM METHOD

BACKGROUND OF THE INVENTION

1. Field of the Invention

This invention relates in general to chewing gum compositions and, more particularly, to a novel method for making chewing gum.

2. Description of the Prior Art

As is well-known in the art, chewing gum has two principal ingredients, namely, a gum base and a bulking agent, such as a carbohydrate. In addition, minor amounts of coloring, texture modifiers, syrups and flavoring are also usually incorporated into the mixture. U.S. Pat. Nos. 2,290,120, issued July 14, 1942; 2,265,465, issued Dec. 9, 1941; and 3,262,784, issued July 26, 1966, are examples of conventional chewing gum formulations and methods of manufacture.

SUMMARY OF THE INVENTION

The present invention provides a method of making chewing gum in which the speed and facility of production are increased over prior known methods. In addition, chewing gum produced according to the method of the present invention has enhanced initial and long-lasting taste balance qualities, particularly when xylitol is used as a principal bulking agent ingredient.

In general, according to the method of the present invention, the viscosity of a chewing gum base is reduced to a value less than approximately 200,000 cps (centipoises) by heating the base to a temperature in the range of 70° to 90° C. To this heated base is added a major portion of the total amount of an unheated bulking agent, which is homogeneously mixed with the base during this addition. Thereafter, the mixture is cooled to a temperature in the range of 35° to 70° C. to increase its viscosity and to form granules thereof. Finally, the balance of the bulking agent is added, preferably in increments, to the cooled mixture to form layers of bulking agent around the base granules.

Thus, by taking advantage of the relatively high viscocity of the chewing gum base at temperatures previously regarded as too low for chewing gum manufacture, an improved distribution of bulking agent particles results. Furthermore, the processing time is minimized by the effective cooling resulting from the addition of the unheated bulking agent in a first major increment. In addition, the resultant product is readily tabletable.

The overall effect of the resultant chewing gum product is an improved initial taste impact due to the superficially positioned, typically sweet, bulking agent and a subsequent, long-lasting taste development due to the internal mixture of the bulking agent with the base.

Accordingly, an object of the present invention is to provide an improved method for manufacturing chewing gum.

It is another object of the present invention to increase the speed and facility of production of chewing gum.

A further object of the present invention is to provide a method of making chewing gum having improved initial and long-lasting taste qualities.

Yet another object of the present invention is to provide a method for making a chewing gum composition which is readily tabletable using conventional tableting machinery.

Other objects and advantages of the present invention will become apparent from the following description, which discloses a preferred method.

BRIEF DESCRIPTION OF THE DRAWINGS

FIG. 1 is a schematic illustration of a section of molten gum base prior to addition of any bulking agent;

FIG. 2 schematically illustrates the effect of adding a portion of carbohydrate or bulking agent to the molten gum base of FIG. 1;

FIGS. 3 through 6 illustrate magnified granules of gum base after the addition of additional portions of bulking agent;

DESCRIPTION OF THE PREFERRED METHOD

Figure 7:
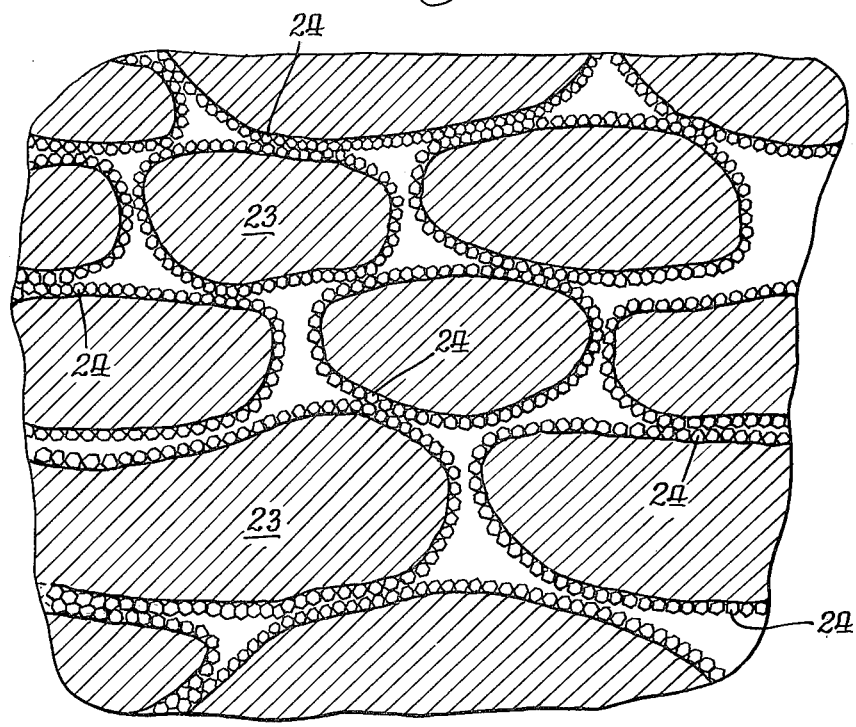
FIG. 7 is a schematic illustration of a section of chewing gum showing the superficial positioning of the bulking agent around the granules consisting of homogeneously mixed gum base and the bulking agent.

In general, according to the preferred method of the present invention, a chewing gum composition is manufactured by first reducing the viscosity of a chewing gum base to a value of less than approximately 200,000 cps (centipoises) by heating the base to a temperature in the range of approximately 70° to 90° C. To this heated, molten base is added, rapidly, a major portion, preferably 50%, of the total amount of an unheated bulking agent, such as a carbohydrate or a sugarless sweetener, while homogeneously mixing the bulking agent into the base. If the bulking agent is pre-cooled, only about 35% of its total amount is required for this step. The bulking agent is exposed to a temperature and stress condition in which the base particles deform with a tendency toward stretching and the mixture is cooled to a temperature in the range of 35° to 70° C. to increase its viscosity and to form granules thereof. Finally, to this mixture, cooled to a temperature within the limits imposed by the mixing equipment, the balance of the bulking agent is added, preferably in at least two increments. At the increased viscosity and lower temperatures, the mixture is subjected to higher shear forces and layers of the bulking agent form around the granules, which consist of the homogeneously mixed gum base and bulking agent.

As a result of this method, the initially added bulking agent homogeneously becomes incorporated into the molten base. The subsequently added bulking agent is layered superficially around the particles of homogeneously mixed base and bulking agent. The overall effect of the resultant chewing gum product is an improved initial taste impact due to the superficially positioned, typically sweet bulking agent separatant followed by a long-lasting taste development due to the internal mixture of the base with the bulking agent; the base particles delay access of saliva to the internal bulking agent particles until considerable chewing has occurred. The resultant distribution of superficially positioned bulking agent facilitates tableting using conventional machinery.

A chewing gum base used in the method of the present invention is any masticatory solid or viscous liquid such as listed in Title 21 of the U.S. Code of Federal Regulations at Section 172.615.

The bulking agent can consist of carbohydrates and carbohydrate alcohols such as glucose, sucrose, dextrin, xylitol, sorbitol, mannitol, dried invert sugar, fructose, levulose, galactose, corn syrup solids and the like. Because these carbohydrate derivatives and water soluble carbohydrate granule separatants are themselves tabletable, their presence on the surfaces of gum base particles will enhance the tableting of the final gum product. Such separatants counteract the natural tackiness of the gum base granules which would otherwise interfere with the granule flow in conventional tableting equipment by premature adhesion to the equipment or to each other.

In addition to the bulking agent, minor amounts of coloring, texture modifiers, syrups and flavoring can be incorporated into the chewing gum in a well-known manner. Softeners may include oleaginous or fatty material such as cocoa butter and hydrogenated vegetable oils. Film extenders usually consist of synthetic resins such as polyvinyl acetate and ester gum resins. Finally, texture agents are typically glycerol monostearate, gum arabic and talc.

The mixing equipment employed in the method of the present invention can consist of any one of the commercially available high power mixers, such as the Baker-Perkins, Hobart, Sigma or Dow mixers, or a twin screw extruder, a roller mill or other known high-shear mixer or blender.

With reference to the drawings, FIG. 1 schematically illustrates a section of molten chewing gum base 11 heated to a temperature in the range of 70° to 90° C. prior to the addition of any bulking agent. The gum base has a glass-like structure with air bubbles, generally indicated by reference numeral 12, trapped inside. Although it is molten, it is extremely viscous.

FIG. 2 schematically illustrates the effect of adding to 100 pbw of the molten gum base of FIG. 1 a first increment of 80 parts by weight (pbw) of a bulking agent consisting of a sugar. The base retains its glass-like structure with large crystals 13 and small crystals 14 adhering to its surface. Additional crystals, generally indicated by reference numeral 15, are submerged into the base. The air bubbles 12 are still present.

FIG. 3 illustrates a magnified, typical base granule 16 broken from the glass-like base of FIG. 2 upon the addition of a second increment of 80 pbw sugar. The surface of the granule is a lattice of base strands, as shown in FIG. 3, with the relatively small sugar crystals 13 attached to the lattice structure. Larger sugar crystals, indicated by reference numeral 17, also attach to the surface of the base granule 16.

FIG. 4 illustrates a typical granule of base 18 broken from the larger granule of FIG. 3 as a result of the addition of a third 80 pbw increment of sugar. The granule 18 is covered by sugar crystals 19.

With reference to FIG. 5, after the addition of a fourth similar increment of sugar at low temperatures (see Example No. 2 herein), a still smaller particle of base 21 breaks off of the typical granule 18 illustrated in FIG. 4. Typical particle 21 is covered by a coating of small sugar crystals 13 and larger sugar crystals indicated by reference numeral 22.

Following the addition of a fifth and last 80 pbw increment of sugar, a typical particle or granule 23, schematically illustrated in FIG. 6, results. The granule 23 is smaller in size than the granule 21 of FIG. 5. As shown in FIG. 6, sugar crystals 24 form a generally uniform, continuous separatant coating or layer around particle 23 with the smaller crystals 13 being submerged into the base granule, as previously described.

FIG. 7 is a schematic illustration of a section of chewing gum comprising typical granules illustrated in FIG. 6. The chewing gum base particles 23 each comprise the mixture of chewing gum base and the sugar crystals 13. Each particle 23 is coated with a layer of relatively small particles of the sugar separatant 24.

Figure 8:
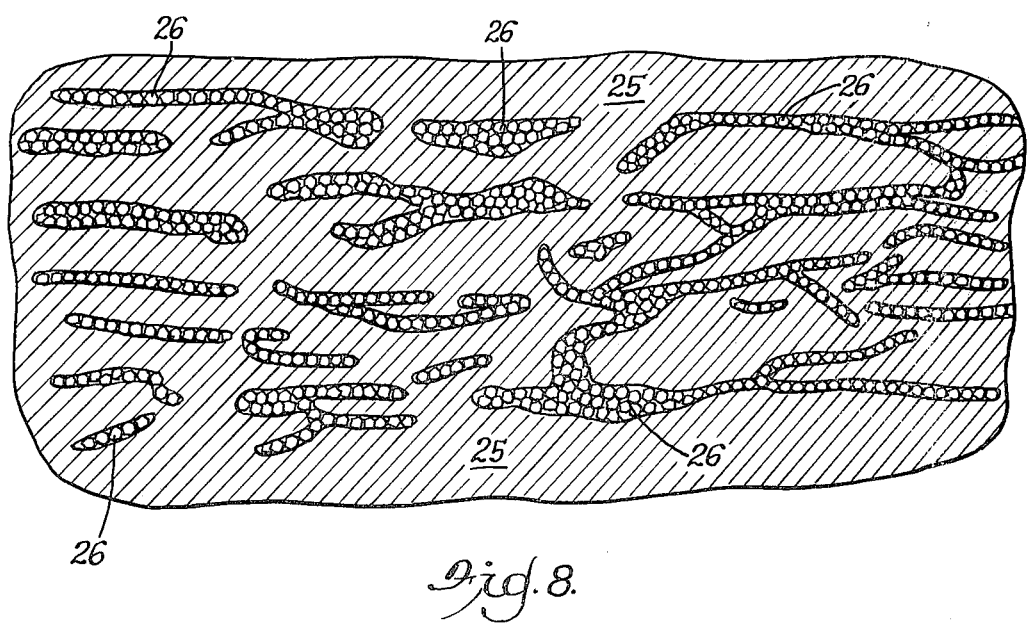
FIG. 8 is a schematic illustration of the effect of the application of pressure to the product of FIG. 7 during a tableting operation.

FIG. 8 schematically illustrates the effect of the application of pressure to the product of FIG. 7 during a tableting operation. Upon the application of tableting pressure, the coated gum base particles or granules 23 rupture and coalesce to form a continuous, coherent gum base network 25. The sugar or other separatant 24 which coated the granules forms irregular layers 26, which appear as streaks in the sectional illustration of FIG. 8. The main cohesion and firmness of the tablets is the result of the continuity of the gum base network material 25. During the tableting operation, entrapped air must leak out of the gum product; for this reason, it is preferable to employ a tablet press which applies the pressure in multiple stages.

The present invention is further illustrated by the following examples in which the proportions are indicated in parts by weight ("pbw").

EXAMPLE NO. 1

100 pbw of 1.0 gram size chewing gum base pellets of a non-tack base such as disclosed in U.S. Pat. No. 3,984,574, issued Oct. 5, 1976, was melted at 90° C. to a viscosity of approximately 200,000 cps. To this gum base was added 250 pbw of powdered xylitol at room temperature, while mixing. The mixing was continued until the xylitol was incorporated into the mixture. The temperature of the mixture was then between 65° and 75° C.

A second increment of 50 pbw of xylitol was then added, while mixing, in order to cause further incorporation of xylitol into the base. At this point, the temperature was reduced to within the range of 45° to 65° C. Conventional flavoring, coloring and softening agents were added at this point.

Addition of a third increment of 50 pbw of powdered xylitol lowered the temperature to within the range of 35° to 50° C.; a last 50 pbw increment of xylitol lowered the temperature to within the range of 30° to 40° C.

The entire process took from 5 to 15 minutes, depending upon the rate of addition of the xylitol increments. Before the temperature of the mix dropped to room temperature, 5 pbw of magnesium stearate lubricant was added to facilitate tableting. Once cooled to room temperature, further mixing serves to decrease the size of the granules.

The resultant product was granulated to form uniform size particles by any of the conventional methods such as precompression; grinding and sieving; or wet granulating with alcohol, water or mineral oil followed by passing the product through a 20 to 80 mesh screen and thereafter drying. The product was easily tableted on conventional machinery.

The resultant tablets of chewing gum had superior, long-lasting chewing and flavor characteristics.

EXAMPLE NO. 2

100 Parts by weight of chewing gum base pellets identical to those used in Example No. 1 was melted at 90° C. until uniformly softened. 80 pbw of powdered xylitol at room temperature was added while mixing. The mixing was continued until the xylitol was incorporated into the mixture. The temperature at this point dropped to within the range of 70° to 80° C. and the desired flavoring, softening and coloring agents were added.

A second increment of 80 pbw xylitol was then added and, as a result, additional xylitol became incorporated into the base. The temperature at this point was between 45° and 55° C. A third 80 pbw increment of xylitol lowered the temperature to within the range of 42° to 52° C., a fourth 80 pbw increment of xylitol lowered the temperature further to a level between 38° and 48° C. and a final 80 pbw increment of xylitol lowered the temperature still further to within the range of 35° to 45° C.

The entire process took from 5 to 15 minutes, depending upon the rate of addition of the xylitol increments. Before the temperature dropped to room temperature, 5 pbw of magnesium stearate as a lubricant was added to facilitate tableting. Additional mixing at room temperature decreased the size of the granules.

The resultant product was granulated and tableted by conventional methods described in Example No. 1.

EXAMPLE NO. 3

100 Parts by weight of tacky, colorless and sugarless chewing gum base was melted at 90° C. and uniformly softened. To this base was added 250 pbw of powdered xylitol, at room temperature, while mixing. The mixing was continued until the xylitol became incorporated into the base. The temperature of the mixture dropped to within the range of 40° to 50° C. Three further increments of xylitol, each 50 parts by weight, were added at progressively lower temperatures. Addition of second, third and the fourth increments of xylitol lowered the temperature to within ranges of 35° to 50° C., 40° to 45° C. and 32° to 42° C., respectively.

The entire process required substantially less time than the processes of Examples Nos. 1 and 2 because of the different cooling properties of the bases employed. Before the temperature dropped to room temperature, 5 parts by weight of powdered talc was added to facilitate tableting. Once at room temperature, more mixing decreased the size of the granules.

The resultant product was granulated in a conventional manner and tableted using ordinary tableting machinery.

EXAMPLE NO. 4

100 pbw of tacky, colorless and sugarless chewing gum base was melted at 70° C. until uniformly softened. To this base were added 80 pbw increments of powdered sucrose at room temperature while mixing. The mixing was continued until the sucrose was incorporated into the mixture. The resultant temperatures and sizes of the increments were as shown in the following table:

| Increment | Size | Temperature Range |
| --- | --- | --- |
| 1 | 80 pbw | 50° to 60° C. |
| 2 | 80 pbw | 45° to 55° C. |
| 3 | 80 pbw | 40° to 50° C. |
| 4 | 80 pbw | 35° to 45° C. |
| 5 | 80 pbw | 35° to 45° C. |

This process required substantially less time than that of either Examples Nos. 1 or 2 because of the lower temperature of the initially melted base.

Before the temperature dropped to room temperature, 5 pbw of powdered magnesium stearate was added to facilitate tableting.

EXAMPLE NO. 5

100 Parts of non-tacky colored chewing gum base identical to that used in Example No. 1 was formed into pellets which were heated at 80° C. until uniformly softened. 80 pbw of powdered xylitol at room temperature was added while mixing, which was continued until the xylitol was incorporated into the mixture. The temperature was between 60° and 65° C. at this point.

A second increment of 80 pbw of xylitol was then incorporated into the base, reducing the temperature to a level between 55° and 65° C. Water soluble flavor, coloring, and a softening agent and five pbw of water were added after this increment. Third, fourth and fifth 80 pbw increments lowered the temperature to within the ranges of 45° to 55° C., 38° to 48° C. and 35° to 45° C., respectively. As in the previous examples, further mixing at room temperature decreased the size of the granules.

The resultant product was granulated and tableted in a conventional manner to produce chewing gum tablets with excellent chewing and taste characteristics.

EXAMPLE NO. 6

100 pbw of tacky, colorless and sugarless chewing gum base pellets was heated at 80° C. until uniformly softened. 100 pbw of powdered sucrose at room temperature was added while mixing, and the mixing was continued until the sucrose was uniformly incorporated into the mixture. A second increment of 100 pbw sucrose was then added to the mixture, and again mixing was continued until the excess sucrose was incorporated into the mixture. Prior to the addition of a third 100 pbw increment, flavoring, coloring and softening agents were added. Third and fourth increments of 100 pbw of powdered sucrose were then added, allowing for the excess sucrose to become incorporated into the mixture in each case. The final temperature of the mixture was in the range between 35° and 45° C.

The resultant product was granulated and easily tableted in a conventional manner.

EXAMPLE NO. 7

100 pbw of 1.0 gram size pellets of a non-tacky colored base identical to that used in Example No. 1 and 200 pbw of powdered xylitol were heated at 90° C. until uniformly softened. 100 pbw of powdered xylitol at room temperature was added while mixing, and the mixing was continued until a homogeneous mass was obtained. Within minutes after this addition, the temperature of the mixture dropped to a level between 45° and 55° C. A second increment of 100 pbw of xylitol was added while mixing until a homogeneous mass was obtained; the temperature at this point was between 35° and 45° C. Before the temperature dropped all the way to room temperature, 5 pbw of magnesium stearate was added to facilitate tableting. The resultant product was granulated and tableted in a conventional manner.

EXAMPLE NO. 8

100 pbw of 1.0 gram size pellets of a non-tacky colored base identical to that used in Example No. 1 and 200 pbw of granular xylitol were heated at 90° C. until uniformly softened. This mixture was allowed to stand until the temperature was reduced to a level between 55° and 65° C. 50 pbw of powdered xylitol at room temperature was added while mixing. Three other 50 pbw increments of powdered xylitol were added with ample time between the additions for mixing. The final temperature ranged from 35° to 45° C.

The process took considerably longer than 15 minutes because of the cooling properties of the base. The time for this process could be reduced by use of an external cooling device or apparatus.

The resultant product was granulated in a conventional manner and tableted by compression in a rotary punch type tableting machine.

EXAMPLES NOS. 9-17

Following low viscosity base procedures similar to those utilized in the preceding Examples, the following substances were utilized as bulking agents with chewing gum bases:

| | |
|---|---|
| Example No. 9 | Tribasic Calcium Phosphate |
| Example No. 10 | Magnesium Carbonate |
| Example No. 11 | Bentonite |
| Example No. 12 | Calcium Carbonate |
| Example No. 13 | Talc |
| Example No. 14 | Calcium Acetate |
| Example No. 15 | Charcoal |
| Example No. 16 | Magnesium Powder |
| Example No. 17 | Teflon Powder |

The embodiments of the invention in which an exclusive property or privilege is claimed are defined as follows:

1. A method of making a chewing gum composition comprising the steps of:
   reducing the viscosity of a chewing gum base to a value less than approximately 200,000 cps by heating to a temperature in the range of approximately 70° to 90° C.;
   rapidly adding to said base a substantial portion of the total amount of an unheated bulking agent;
   homogeneously mixing said bulking agent with said base while said bulking agent is added thereto;
   cooling the mixture to a temperature in the range of 35° to 70° C. to increase the viscosity of the mixture and to form granules thereof; and
   adding to the cooled mixture the balance of said bulking agent in order to form layers thereof around said granules.

2. The method of claim 1 wherein said portion consists of at least 20% of the total amount of said unheated bulking agent.

3. The method of claim 1 wherein said portion consists of approximately one-half of the total amount of said unheated bulking agent.

4. The method of claim 1 wherein said bulking agent is a carbohydrate.

5. The method of claim 1 wherein said bulking agent is an inorganic substance.

6. The method of claim 1 wherein said bulking agent is a sugarless sweetener.

7. The method of claim 1 wherein said bulking agent is xylitol.

8. The method of claim 1 and the additional step of pre-cooling at least 35% of the total amount of said bulking agent prior to the initial addition of said bulking agent to said base.

9. The method of claim 1 wherein said balance of said bulking agent is added to said cooled mixture in at least two increments.

10. The method of claim 1 and the additional steps of granulating and then tableting said coated granules.

* * * * *